M. E. DEGGE.
ATTACHMENT FOR LISTER CULTIVATORS.
APPLICATION FILED NOV. 6, 1919.
1,355,454. Patented Oct. 12, 1920.
2 SHEETS—SHEET 2.
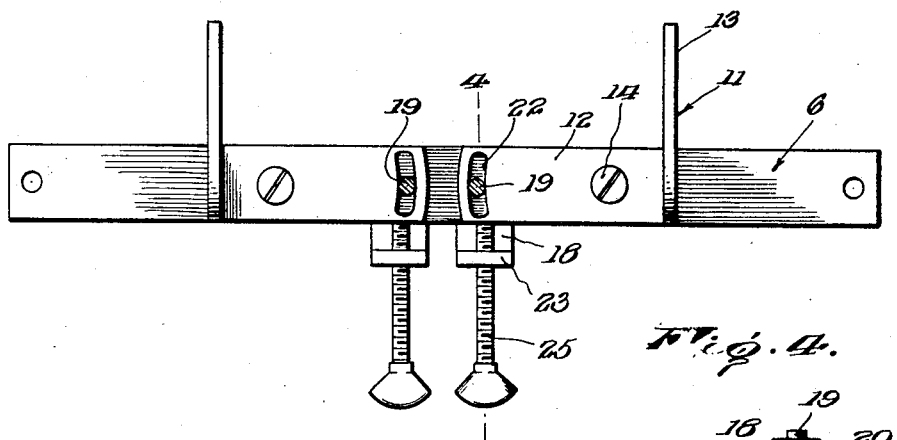
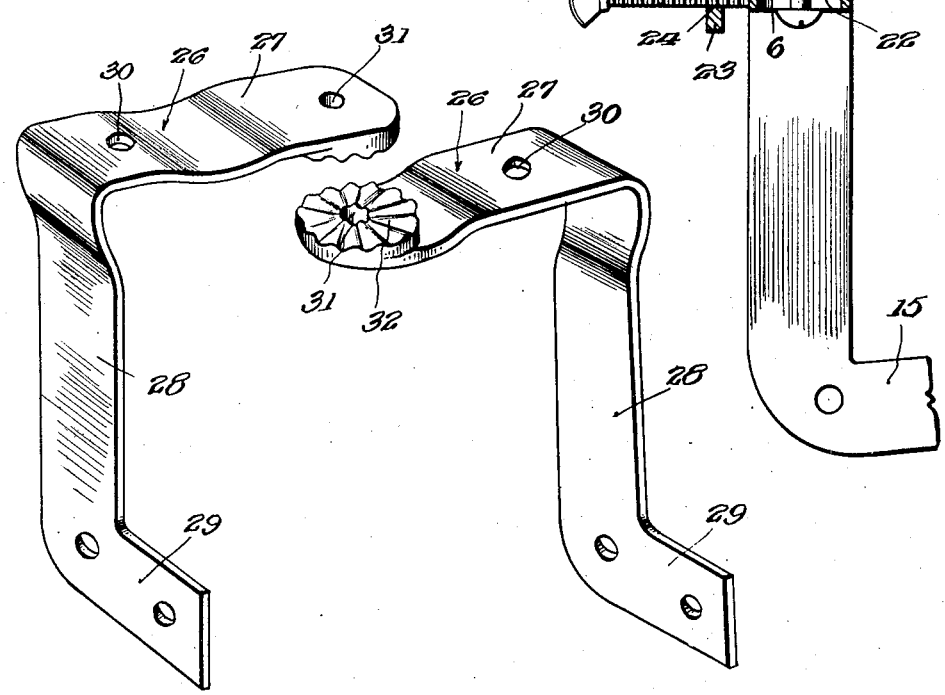
INVENTOR.
M. E. Degge.
by Lacey & Lacey, Attys.

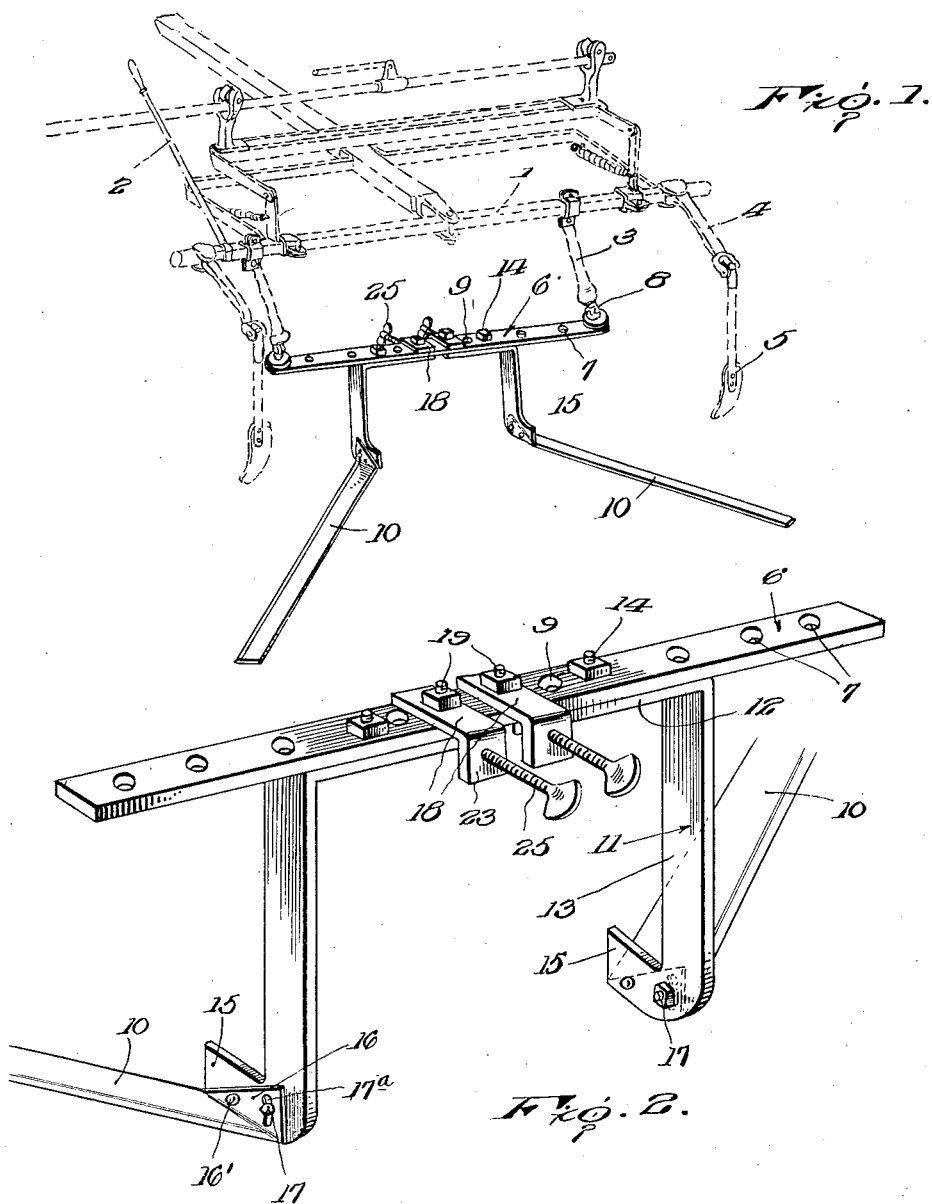

UNITED STATES PATENT OFFICE.

MARVIN E. DEGGE, OF KRESS, TEXAS.

ATTACHMENT FOR LISTER-CULTIVATORS.

1,355,454.  Specification of Letters Patent.  Patented Oct. 12, 1920.

Application filed November 6, 1919. Serial No. 336,011.

*To all whom it may concern:*

Be it known that I, MARVIN E. DEGGE, a citizen of the United States, residing at Kress, in the county of Swisher and State of Texas, have invented certain new and useful Improvements in Attachments for Lister-Cultivators, of which the following is a specification.

This invention relates to attachments for lister cultivators and more particularly to an improved knife attachment for cultivators of this type and one object of the invention is to provide an attachment which may be readily applied to any of the well-known lister cultivators and employed either alone or in connection with the plows of the implement.

In the accompanying drawings:

Figure 1 is a perspective view of the attachment applied to a lister cultivator;

Fig. 2 is a detail perspective view of the attachment removed from the cultivator;

Fig. 3 is a bottom plan view of the attachment;

Fig. 4 is a vertical transverse sectional view taken substantially on the line 4—4 of Fig. 3;

Fig. 5 is a perspective view illustrating a slightly modified form of the invention.

In Fig. 1 of the drawings there is illustrated so much of a lister cultivator as is necessary to disclose the application of the invention and in this figure the numeral 1 indicates the usual cross-beam which is supported for rocking movement and actuated by the lever 2 and which carries the arms 3 which ordinarily support the disks of the implement. This cross-beam also carries the usual arms 4 which support plow shovels 5 and in the use of the attachment these shovels may be permitted to remain in place or they may be detached either as found desirable.

In that form of the invention shown in Figs. 1 to 4 inclusive, the attachment comprises a cross bar which is indicated in general by the numeral 6 and which is formed near each end with a series of openings 7, through which and the ends of the arms 3 may be passed bolts 8 for the purpose of securing the said end portions of the bar to these arms whereby the bar will extend between the rear ends of the arms and be supported thereby. The bar 6 is also formed in its mid portion with a series of openings 9 the purpose of which will be presently explained.

The knives above referred to are indicated by the numeral 10 and these knives are designed to be supported by brackets which are in turn mounted upon and extend downwardly from the cross bar 6. Each of these brackets, indicated in general by the numeral 11, comprises an attaching portion 12 and a shank portion 13, these portions extending at right angles to each other and the attaching portion 12 being disposed against the under side of the cross bar 6, as clearly shown in the drawings. In this position of the parts the shanks 13 of the brackets will extend downwardly, and if desired, slightly rearwardly. In connecting the attaching portions with the cross bar 6, the said portions are as stated disposed against the under side of the bar and are so relatively arranged that their extremities will be located relatively close together. Bolts 14 are introduced through suitable ones of the openings 9 and through corresponding openings located inwardly of the extremities of the attaching portions 12 of the brackets 11 and in this manner the brackets are connected with the cross bar 6 and may be angularly adjusted about the bolts 14 as pivots. The manner in which this adjustment is obtained will presently be described. The lower end of the shank 13 of each bracket 11 is turned rearwardly to provide a foot 15, and each blade 10 is provided with an angularly extending attaching end or shank 16 which is pivoted as at 16' to the foot 15 and is formed with an arcuate slot 17ª through which and the said foot is passed a bolt 17 whereby the blades may be slightly tilted with relation to the ground surface. The angular disposition of the shanks 16 of the blades with relation to the body portions of the blades will preferably be such that the blades will extend laterally in an outward direction and rearwardly as shown in Fig. 1.

Of course, angular adjustment of the brackets about their attaching bolts 14 will result in angular adjustment of the blades 10 and in order that the brackets may be so adjusted, means is provided which will now be described. Two straps 18 are disposed beside one another upon the upper side of the bar 6 and bolts 19 are passed through openings 20 in these straps and through similar openings 21 in the said bar 6. The attaching portions 12 of the brackets are formed with arcuate slots 22, and the shanks of the bolts 19 extend also through these slots. Each strap 18 is provided at its forward end with a depending lug 23 having a threaded opening 24, and an adjusting screw 25 is adjustably fitted through the opening and bears at its end against the forward edge of the attaching portion 12 of the respective bracket 11, as clearly shown in Figs. 3 and 4 of the drawings. It will now be evident that upon loosening the bolts 14 and 19, the screws 25 may be adjusted so as to vary the angular disposition of the brackets with relation to the cross bar 6 and thus angularly adjust the blades 10 which are supported by these brackets. After the desired adjustment has been obtained, the bolts 14 and 19 are again tightened whereupon the brackets will be securely held against displacement. The strain upon the knives 10 is such, in the forward travel of the implement, that the extremities of the attaching portions 12 of the brackets will tend to swing forwardly but this movement is arrested, of course, by the adjusting screws 25 and thus there is no likelihood of the adjustment of the blades being disturbed so long as the adjusting screws 25 are properly set.

In that form of the invention shown in Fig. 5 of the drawings, the brackets for the two blades are indicated in general by the numeral 26 and each bracket has an attaching portion 27 and a shank portion 28 terminating in a foot 29, these parts corresponding respectively to the attaching portion 12, shank 13, and foot 15 of the brackets 11 previously described. In this form of the invention the attaching portions 27 are formed with openings 30 which correspond to the openings 9 and through which the bolts 14 may be passed. The angular adjustment of the brackets in this instance, however, is effected by having the adjacent ends of the attaching portions 27 of the two brackets overlap as shown in the said Fig. 5 and by forming in these overlapping portions an opening 31 through which a set bolt is passed, this bolt being loosened to permit of angular adjustment of the brackets about their bolts 14 and being tightened when the desired adjustment has been obtained. The meeting faces of these portions of the bracket are formed with interlocking corrugations 32 radial to the bolt openings 31 to prevent displacement of the sections.

Having thus described the invention, what is claimed as new is:

1. A cultivator attachment comprising a supporting bar, brackets each consisting of an attaching arm adapted to fit against the under side of the supporting bar, a shank depending from one end of the arm and a rearwardly extending foot at the lower end of the shank, pivotal connections between the supporting bar and the respective attaching arms of the brackets, means for adjusting the arms about said pivotal connections in a horizontal plane, and a blade secured to and extending laterally and rearwardly from the foot on each bracket.

2. An attachment of the class described comprising a supporting bar, brackets having attaching portions mounted upon the bar for angular adjustment, bearing members carried by the bar and having portions located opposite the ends of the attaching portions of the brackets, adjusting screws threaded through the said portions of the bearing members and engaging the end portions of the attaching members of the brackets, and a blade supported by each bracket.

In testimony whereof I affix my signature.

MARVIN E. DEGGE. [L. s.]